UNITED STATES PATENT OFFICE.

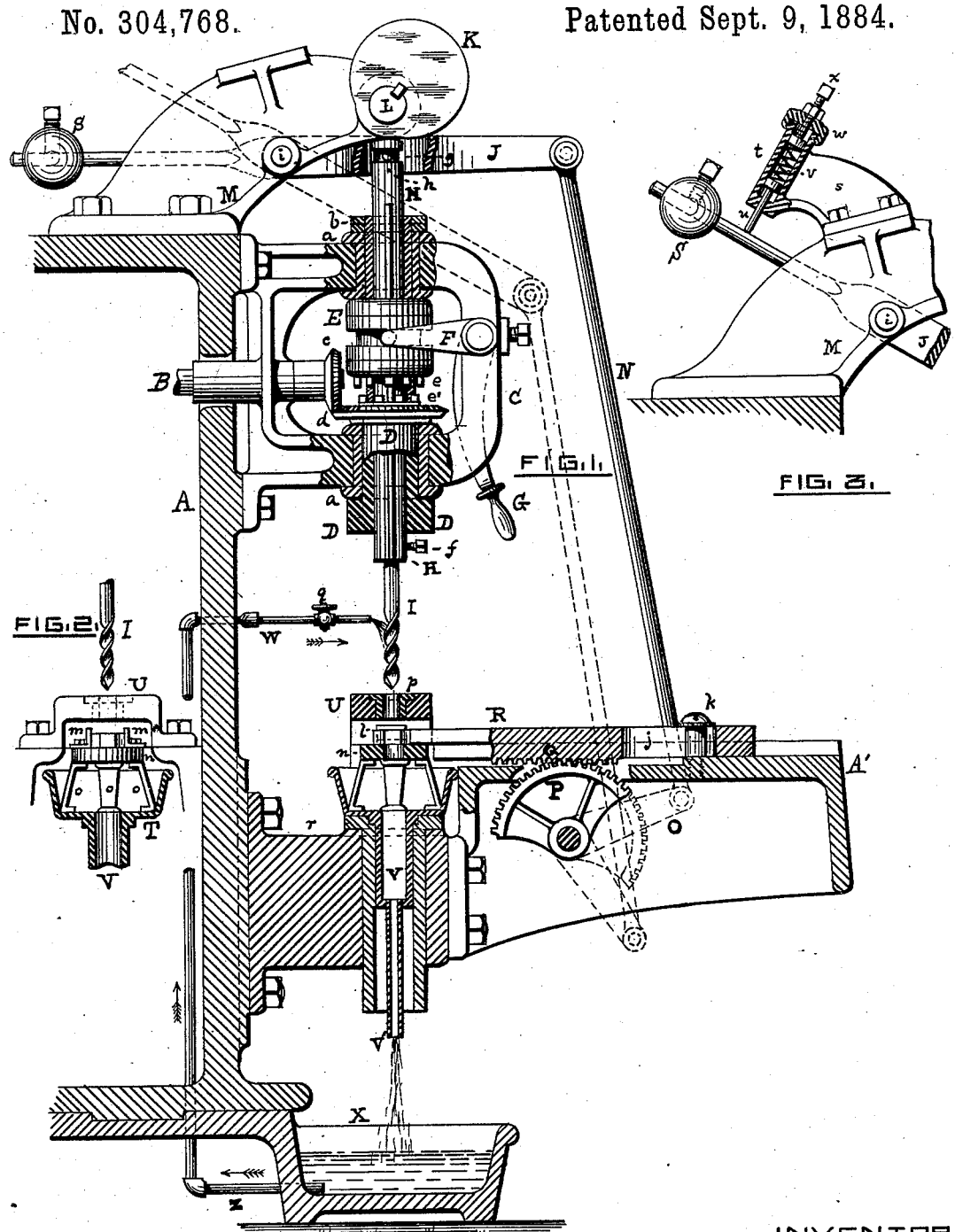

GEORGE H. WEBB, OF PAWTUCKET, RHODE ISLAND.

MACHINE FOR DRILLING NUTS.

SPECIFICATION forming part of Letters Patent No. 304,768, dated September 9, 1884.

Application filed October 12, 1883. (No model.)

*To all whom it may concern:*

Be it known that I, GEORGE H. WEBB, of Pawtucket, in the county of Providence, in the State of Rhode Island, have invented a new and useful Improvement in Machines for Drilling Nuts; and I do hereby declare the following to be a specification thereof, reference being had to the accompanying drawings.

Like letters indicate like parts.

Figure 1 is a side elevation of my invention. Fig. 2 is a front elevation of the nut-holder and drill in position. Fig. 3 is a detail view.

In the manufacture of nuts for bolts and other uses it has been common to punch a hole through the blank, which is afterward tapped to form the female screw-thread; but by the operation of punching the integrity of the fiber of the metal is apt to be destroyed, and the threads formed therein are liable to break or crumble in consequence; hence in fine-nut manufacture it is desirable to bore or drill out the hole which has been punched in the blank, so as to expose a strong and perfect surface to the action of the tapping-tool.

My invention is intended for boring or drilling nuts for this purpose; and it consists of a drill inserted in a spindle which has a vertical movement imparted to it by a cam, and is splined within another spindle mounted in the head-stock of the machine, which latter spindle revolves by throwing a clutch-gear fastened thereto into engagement with a loose-running beveled gear mounted thereon and driven by the main shaft, by which combination the drill is made both to rotate and descend when said gearing is engaged, and to cease its operation when said gearing is disengaged; and, secondly, in combining with said boring mechanism a nut-feeding device consisting of a nut-feeding bar having a longitudinal slot and set-screw, which passes through it into the frame of said machine, said feed-bar being moved back and forth by a toothed sector mounted on an axis and rocked by a fixed arm thereof, a connecting-rod and a balanced lever-arm which follows by suitable connection the top of the spindle containing the drill.

In the drawings, A represents the frame of the machine, and B its main shaft. A head-stock, C, serves to support the gearing and its connections. Bushings *a a* furnish suitable friction-bearings, within which a spindle, D, revolves, being sustained therein by the check-nuts *b*. At the end of the main shaft B is a beveled gear, *c*, engaging with a beveled gear, *d*, which is mounted loosely upon said spindle D. A clutch-pulley, E, is also mounted upon the spindle D, and has a slight longitudinal movement thereon by means of a key or spline, by which connection it compels said spindle to revolve whenever the clutches or teeth *e* are dropped into engagement with the clutches or teeth *e'* of the beveled gear *d*. The clutch-pulley E has a circumferential groove, within which pins of the bell-crank lever F fit loosely to raise or lower said pulley, by the handle G of said lever, to engage or disengage said clutches *e e'*, as desired. Within the spindle D, and splined to it, is the spindle H, capable of a longitudinal movement within the spindle D, and revolving with it by means of said spline-connection.

The drill I enters a socket of the spindle H, and is secured therein by the set-screw *f*. At the top of the spindle H is a circumferential groove, *g*, within which a pin, *h*, projecting from the yoke of the lever-arm J, fits loosely, allowing the free revolution of the spindle H, yet compelling the lever J to move vertically with it. An eccentric or cam, K, mounted on and driven by a shaft, L, bears upon and operates the spindle H, thereby driving the drill I downward through the nut. The shaft L has its bearing in the standard M, which projects from the top of the frame A, and said lever or arm J is pivoted to said standard, as shown at *i*. A link or rod, N, pivoted to the arm J at its top, is also pivoted at its bottom to the fixed arm O of an oscillating sector, P, suitably mounted upon an axle, and having teeth to engage the rack Q of the nut-feeding bar R. The feeder R has a longitudinal slot, *j*, and is fastened to the shelf portion A' of the machine by a set-screw, *k*, passing through said slot into said frame. At the opposite end of the arm J is a balance or weight, S, to give steadiness to the movement of said nut-feeding device. The nut *l* is pushed into position by the advancing end of the bar R, which exactly feeds and adjusts the nut to receive the drill I. The nut *l* is pushed between guides *m m* upon a table or platform, *n*, which rests upon suitable legs or supports, *o o*, within the basin or tank T. A cross-block, U, bolted to the frame, has a central bore lined with a bushing, *p*, to guide and steady the drill I in its descent upon and through the nut *l*. The tank T has a tubular extension or pipe, V V'. A tube or pipe, W, having a stop-cock, *q*, discharges upon the drill I a stream of water containing soda in solution, to cool the drill in its work through the nut, which fluid passes through the tank T and pipes V V' into the trough X, whence it is discharged or drawn in any suitable manner through the pipe Z.

I have shown in the drawings the tank and its tubular extension mounted upon an adjustable bracket, *r*, as shown, and more fully specified in Letters Patent of the United States, granted to me for an improvement in nut-tapping machines, dated September 11, 1883, and numbered 284,695, which adjustable bracket is for the same purpose as therein described.

The weight S performs two functions besides that already mentioned. It causes the opposite end of the lever J to rise as soon as the revolution of the cam K reaches its lessening diameter in relation to the head of the spindle H, thus withdrawing the drill from the nut, and also at the same time causes the feed-bar R to advance another nut to be drilled.

In Fig. 3 I show a supporting-block, *s*, bolted to the standard M, and provided with a cylinder, *t*. Said cylinder contains a movable piston-rod, *u*, whose outer end rests against the lever J, and whose inner end bears against a spiral spring, *v*, inclosed therein. The cylinder *t* has a cap, *w*, through which passes a screw-bolt, *x*, to furnish a bearing for the opposite end of the spiral spring *v*. By means of the screw *x* the tension of the spring *v* may be regulated, and consequently the force with which the piston-rod *u* bears against the lever J.

The operation of my improved drilling-machine is as follows: Beginning the description when the parts are in the position shown in solid lines in the drawings, I lift the handle G, thereby throwing the clutch-pulley E into engagement with the gear *d*, which is being revolved by the main shaft B. Thereupon the drill I, by its connection with the spindles D H, is rotated, and at the same time is driven downward by the revolution of the cam K, bearing down the head of the spindle H. While the drill is boring downward the arm J follows down with the head of the spindle H by means of the pin *h* in the groove *g*, and this movement causes the withdrawing of the nut-feeder R; but as soon as the drill I has completed its downward movement and is thrown upward the arm J rises, thereby causing the nut-feeder R to push another nut into position for the next operation of drilling. This rise of the arm J is caused by the superior weight of the ball S, and as the cam K, in its revolution, has then reached its decreasing radii, the head of the spindle H follows up the working edge of said cam, being actuated in its upward movement by said weight S. The said weight thus withdraws the drill from the nut, and at the same time advances the feed-bar R to bring forward another nut to be drilled. Another valuable use of the weight S is to steady the motion of the drill, especially at the finishing of the bore. But for it the drill, when it has bored nearly through the nut, would by its pressure and driving suddenly break through the remaining metal, injuring the fiber thereof, and would be itself liable to breakage by the suddenness and violence of such descent. The weight S in such a case acts as a counterpoise to give steadiness to the movement, and to still further prevent such disastrous consequences I provide the additional security of the spring-actuated piston shown in Fig. 3, by which figure it will be seen that in the latter part of the up-movement of the weighted end of the lever J it strikes against said piston, thereby producing an increased resistance of the head of the spindle H to the working of the cam K while the drill I is finishing its boring. The spring *v* thus compressed also exerts a beneficial impetus subsequently, when relieved, in forcing the lever J back to its former position.

The nuts are fed to the machine in the usual manner, sliding down a trough by their own weight upon a platform, where they are one by one pushed to the die by the feed-bar. After each nut is drilled it is crowded off by the advance of the next nut to be drilled and falls into a proper receptacle.

I prefer to cool the drill by water containing a solution of soda, because the soda prevents the rusting of the tool.

I claim as a novel and useful invention and desire to secure by Letters Patent—

1. In a nut-drilling machine, the combination of the drill-bearing spindle H, having groove *g*, the cam K, and the lever J, provided with pin *h*, and weight S, whereby the spindle is kept in following contact with the working edge of said cam, substantially as described.

2. The combination of the cam K, the lever J, having weight S, the link N, the sector P, having arm O, and the feed-bar R, provided with rack Q, whereby the advance of the feed-bar is regulated by the revolution of the cam, substantially as described.

3. The combination of the drill I, the spindle H, having groove *g*, the spindle D, having gear *d*, provided with clutch-teeth *e'*, the sliding clutch-pulley E, having teeth *e*, the bell-crank lever F G, the cam K, and the weighted lever J, having pin *h*, substantially as described.

4. The combination of the drill I, the vertically-movable and rotary spindle H, the feed-bar R, and connecting mechanism, as described, said nut-feeding and nut-drilling mechanism being arranged in relation to each other, as specified, whereby a nut is drilled while the feeder is receding, and another nut fed while the drill is receding, substantially as set forth.

GEORGE H. WEBB.

Witnesses:
WILLIAM B. W. HALLETT,
WARREN R. PERCE.